United States Patent
Poix et al.

(10) Patent No.: US 9,400,411 B2
(45) Date of Patent: Jul. 26, 2016

(54) MULTIPLE GLAZING HAVING VARIABLE DIFFUSION BY LIQUID CRYSTALS, AND METHOD FOR MANUFACTURING SAME

(75) Inventors: René Poix, Noyon (FR); Elodie Bouny, Gueret (FR); Jingwei Zhang, Massy (FR)

(73) Assignee: CARDINAL IG COMPANY, Eden Prairie, MN (US)

( * ) Notice: Subject to any disclaimer, the term of this patent is extended or adjusted under 35 U.S.C. 154(b) by 151 days.

(21) Appl. No.: 13/877,629

(22) PCT Filed: Oct. 4, 2011

(86) PCT No.: PCT/FR2011/052311
§ 371 (c)(1),
(2), (4) Date: Jun. 14, 2013

(87) PCT Pub. No.: WO2012/045973
PCT Pub. Date: Apr. 12, 2012

(65) Prior Publication Data
US 2013/0265511 A1    Oct. 10, 2013

(30) Foreign Application Priority Data
Oct. 4, 2010  (FR) ..................... 10 58004

(51) Int. Cl.
*G02F 1/1345*  (2006.01)
*G02F 1/1339*  (2006.01)
(Continued)

(52) U.S. Cl.
CPC .......... *G02F 1/137* (2013.01); *B32B 17/10045* (2013.01); *B32B 17/1077* (2013.01);
(Continued)

(58) Field of Classification Search
CPC .................. B32B 17/10045; B32B 17/10293; B32B 17/10504; B32B 17/10761; B32B 17/10788; B32B 17/1077; G02F 1/137; G02F 1/1334; G02F 1/13452; G02F 1/1339
USPC .......................................... 349/149–153, 190
See application file for complete search history.

(56) References Cited

U.S. PATENT DOCUMENTS 4,566,758 A * 1/1986 Bos ............................... 349/128
4,837,745 A * 6/1989 Eich et al. ..................... 365/108
(Continued)

FOREIGN PATENT DOCUMENTS

| CN | 1701265 A | 11/2005 |
|---|---|---|
| CN | 101297340 A | 10/2008 |

(Continued)

OTHER PUBLICATIONS

International Search Report as issued for International Application No. PCT/FR2011/052311, dated Jan. 17, 2012.
(Continued)

*Primary Examiner* — Hoan C Nguyen
(74) *Attorney, Agent, or Firm* — Fredrikson & Byron, P.A.

(57) ABSTRACT

A liquid-crystal multiple glazing including a first glass sheet and a second glass sheet that is sealed by a sealing gasket, first and second electrodes with first and second electricity supply zones, a liquid-crystal layer, between 15 and 60 μm, with spacers, the first glass sheet protruding by a first protruding side and including the first electricity supply zone, electrical cabling with a first cabling input with a first electrically insulating polymer material, a third glass sheet laminated with the second glass sheet, the third glass sheet protruding from the second glass sheet by a side covering the first electrically insulating material, referred to as the first covering side.

23 Claims, 7 Drawing Sheets

Figure 1A:
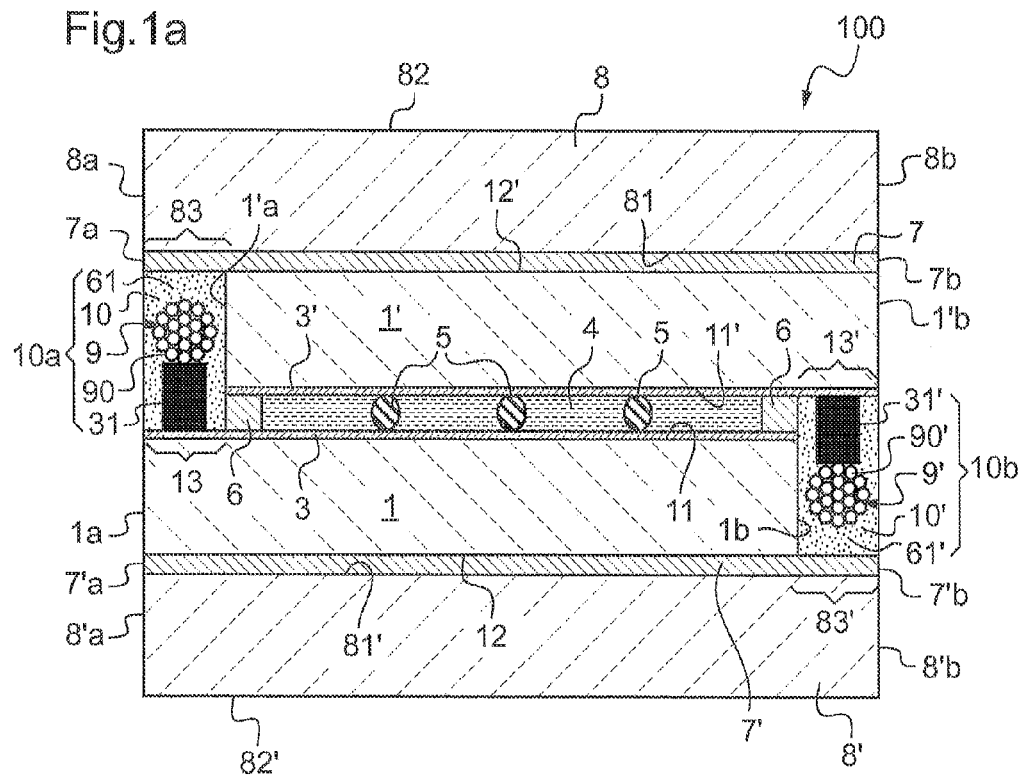

(51) Int. Cl.
   *G02F 1/137* (2006.01)
   *B32B 17/10* (2006.01)
   *G02F 1/1334* (2006.01)

(52) U.S. Cl.
   CPC ..... *B32B17/10293* (2013.01); *B32B 17/10504* (2013.01); *B32B 17/10761* (2013.01); *B32B 17/10788* (2013.01); *G02F 1/1334* (2013.01); *G02F 1/13452* (2013.01); *G02F 1/1339* (2013.01)

(56) References Cited

U.S. PATENT DOCUMENTS

| | | | |
|---|---|---|---|
| 5,142,644 | A | 8/1992 | VanSteenkiste et al. |
| 5,680,185 | A * | 10/1997 | Kobayashi et al. ............. 349/88 |
| 5,691,795 | A | 11/1997 | Doane et al. |
| 5,889,608 | A | 3/1999 | Buffat et al. |
| 2004/0053125 | A1 | 3/2004 | Giron et al. |
| 2005/0190331 | A1 | 9/2005 | Yano |
| 2005/0190332 | A1 * | 9/2005 | Yano ............................ 349/149 |
| 2009/0115942 | A1 * | 5/2009 | Watanabe ...................... 349/96 |
| 2013/0141656 | A1 * | 6/2013 | Kujawa et al. ................. 349/33 |

FOREIGN PATENT DOCUMENTS

| | | |
|---|---|---|
| DE | 3402518 | 8/1985 |
| EP | 0 575 207 | 12/1993 |
| EP | 0 835 743 | 4/1998 |
| EP | 2 093 051 | 8/2009 |
| EP | 2 128 688 | 12/2009 |
| EP | 2 256 545 | 12/2010 |
| GB | 2 296 479 | 7/1996 |
| JP | H01075218 U | 5/1989 |
| JP | H02029023 U | 2/1990 |
| JP | H02062518 U | 5/1990 |
| JP | H02219025 A | 8/1990 |
| JP | H07069047 A | 3/1995 |
| JP | H10175220 A | 6/1998 |
| JP | 2004504630 A | 2/2004 |
| JP | 2005049417 A | 2/2005 |
| JP | 2006330100 A | 12/2006 |
| WO | WO 92/19695 | 11/1992 |
| WO | WO 98/05998 | 2/1998 |
| WO | 2010032069 A1 | 3/2010 |

OTHER PUBLICATIONS

English translation of the International Preliminary Report on Patentability with Written Opinion of the International Searching Authority of Intl. Pat. App. No. PCT/FR2011/052311 (WO2012045973) dated Apr. 9, 2013, 9 pages, International Bureau of WIPO, Geneva, Switzerland.

English translation of Office Action issued for corresponding Chinese Pat. App. No. 2011857923 (Pub. No. CN103238102) on Mar. 12, 2015, 17 pages, The State Intellectual Property Office of People's Republic of China, Beijing, China.

English translation of Notification of Reasons for Refusal issued for corresponding Japanese Pat. App. No. JP2013-532248 (Pub. No. JP2014500972) on Jun. 2, 2015, 3 pages, Japanese Patent Office, Tokyo, Japan.

English translation of Search Report issued for corresponding Japanese Pat. App. No. JP2013-532248 (Pub. No. JP2014500972) on Apr. 24, 2015, 25 pages, Japanese Patent Office, Tokyo, Japan.

* cited by examiner

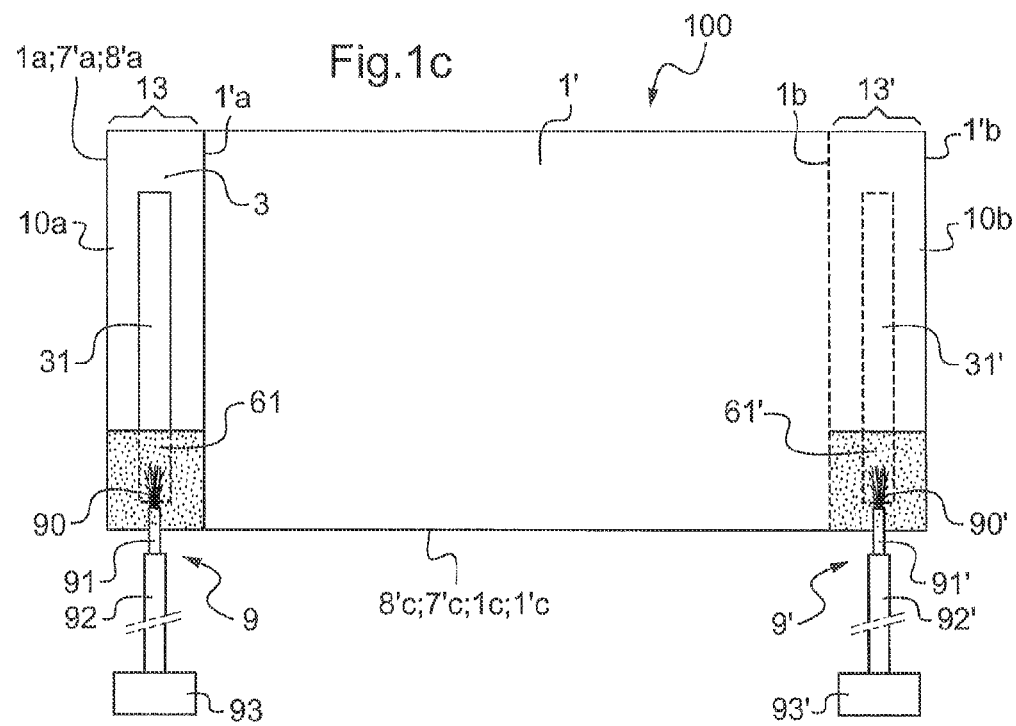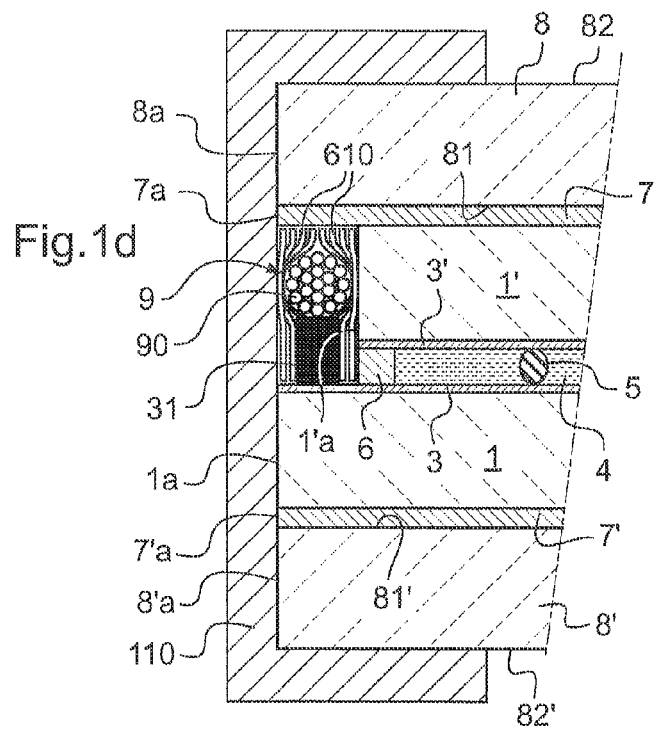

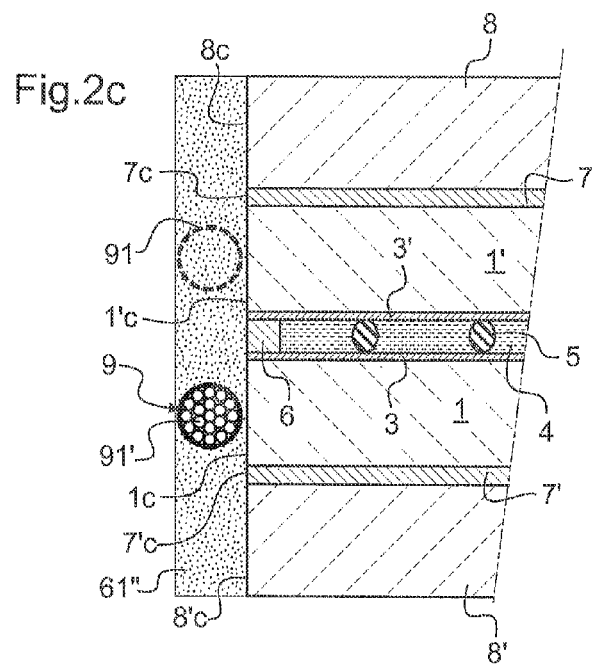
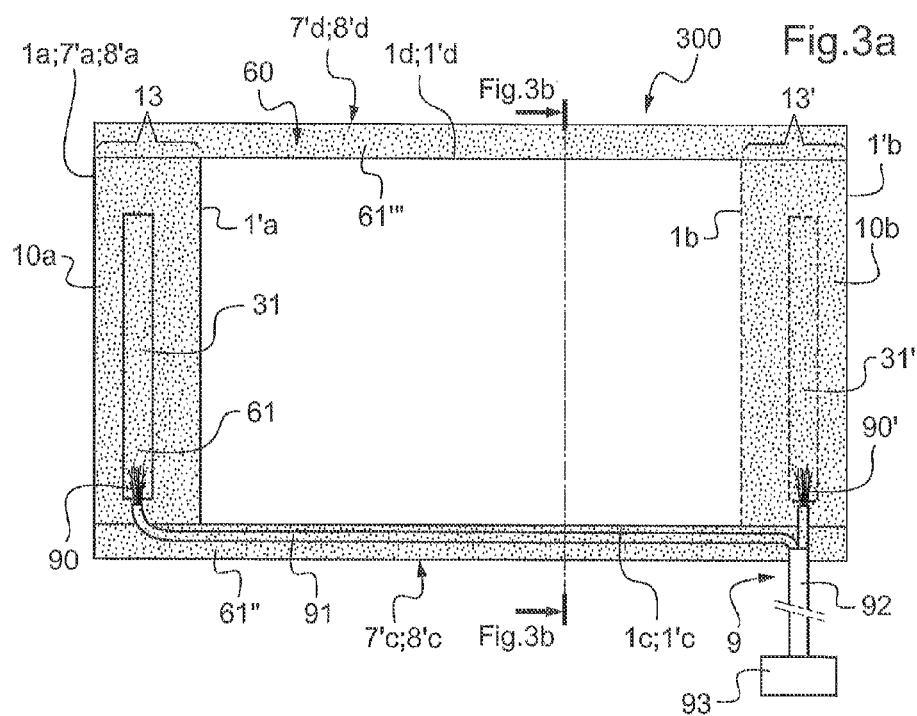

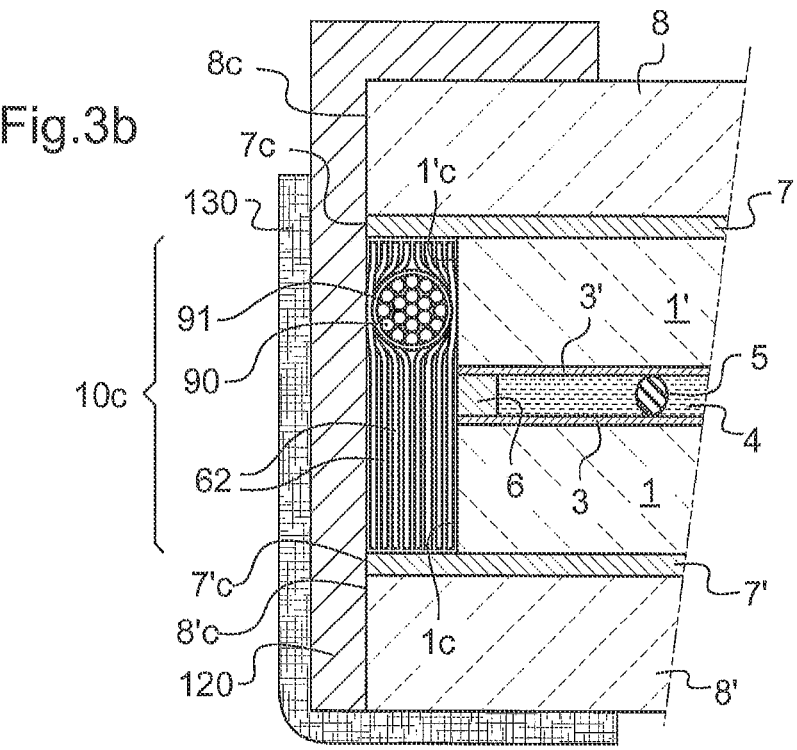
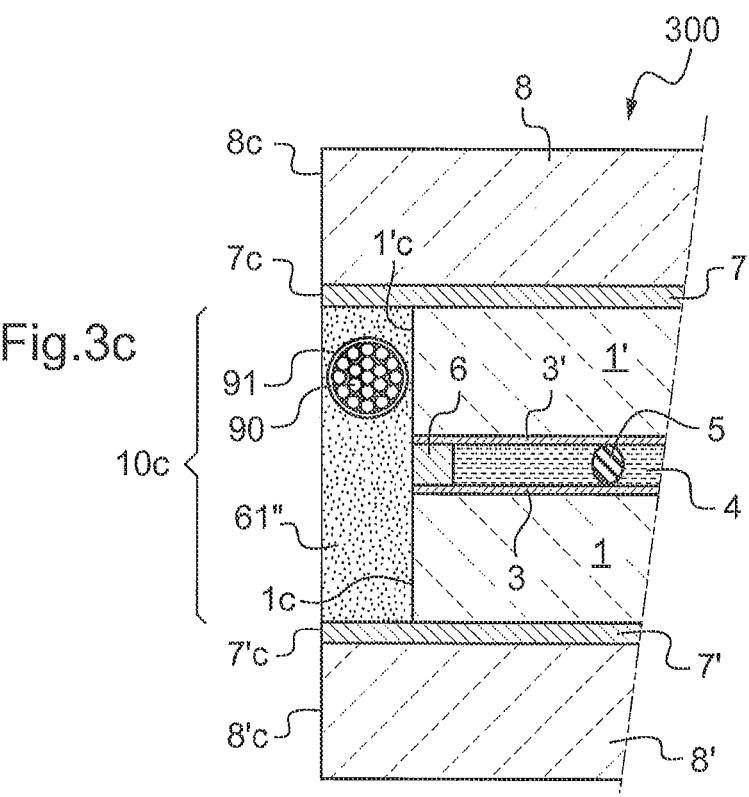

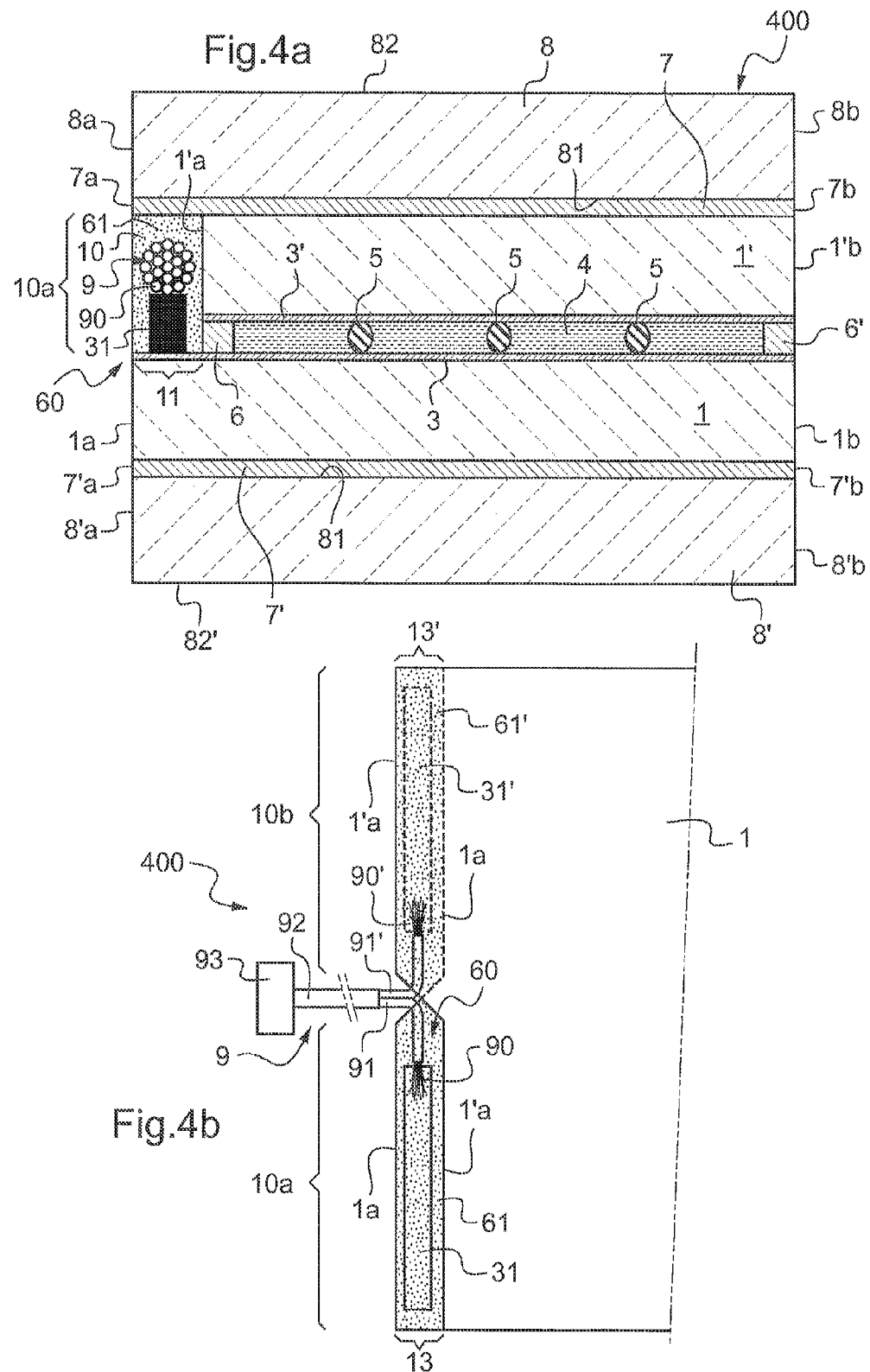

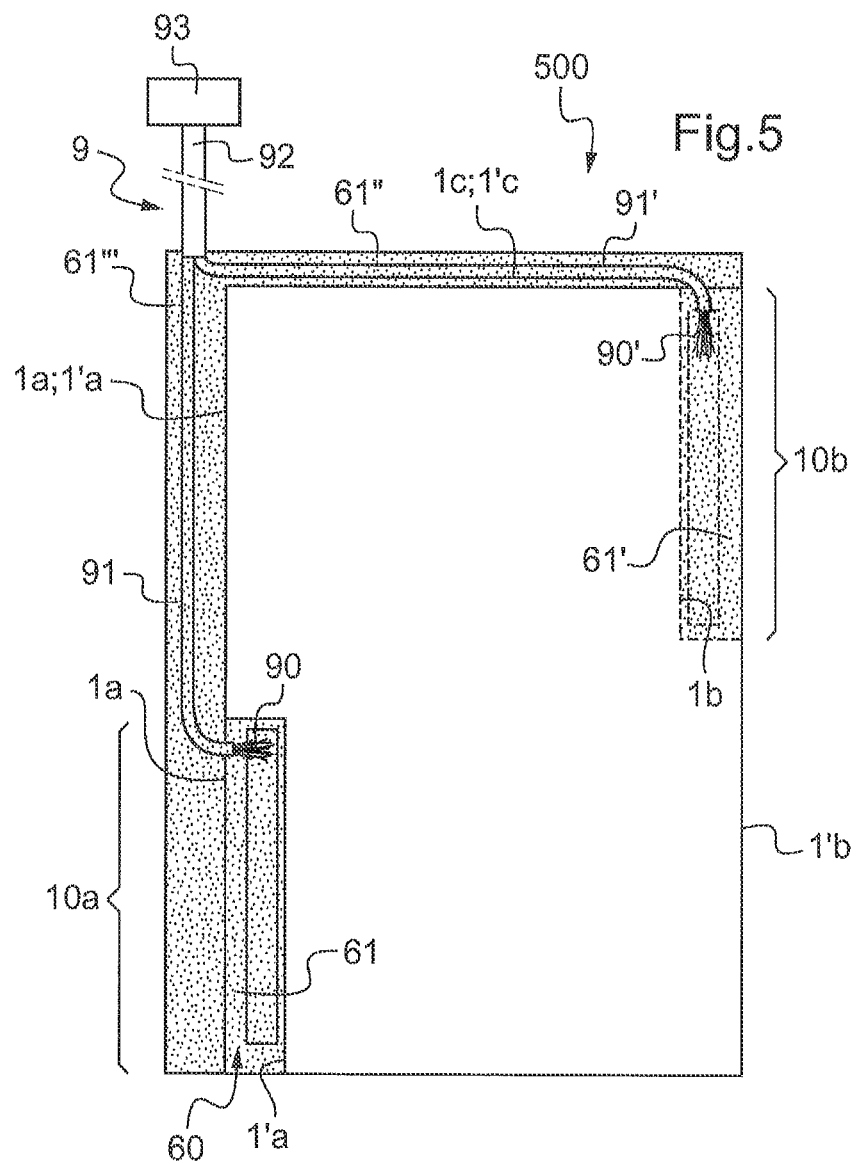

MULTIPLE GLAZING HAVING VARIABLE DIFFUSION BY LIQUID CRYSTALS, AND METHOD FOR MANUFACTURING SAME

CROSS-REFERENCE TO RELATED APPLICATIONS

This application is the U.S. National Stage of PCT/FR2011/052311, filed Oct. 4, 2011, which in turn claims priority to French Application No. 1058004 filed Oct. 4, 2010. The content of these applications are incorporated herein by reference in their entirety.

The invention relates to the field of electrically controllable glazing with variable optical properties and more particularly relates to multiple glazing with variable liquid-crystal-induced scattering, provided with a layer of liquid crystals between two glass sheets and alternating reversibly, by application of an alternating electric field, between a transparent state and a translucent state.

Glazings are known for which certain characteristics can be modified under the effect of an appropriate electricity supply, very particularly the transmission, absorption and reflection at certain wavelengths of electromagnetic radiation, in particular in the visible and/or in the infrared, or else the scattering of light.

Electrically controllable glazing containing liquid crystals can be used everywhere, both in the construction sector and in the motor vehicle sector, whenever the view through the glazing must be prevented at given moments.

Document WO 98/05998 discloses liquid-crystal multiple glazing comprising:
- two 1 m² (float) glass sheets with thicknesses of 6 mm sealed along the side of their inner faces by an adhesive sealing gasket made of epoxy resin,
- two electrodes made of electrically conductive layers based on $SnO_2$:F directly on the inner faces of the glass sheets,
- directly on the electrodes, a 15 μm layer of PSCT-based (polymer stabilized cholesteric texture-based) liquid crystals, incorporating spacers in the form of glass beads.

During the assembly, the two glass sheets are offset leaving opposite sides of electrodes jutting out in order to facilitate the application of adhesive copper strips for delivering the current to the electrodes.

However, it is observed that this liquid-crystal multiple glazing is fragile.

The objective of the present invention is to improve the robustness and reliability of the glazing with variable liquid-crystal-induced scattering, at lower cost, simply and durably.

For this purpose, the present invention provides a multiple glazing with variable liquid-crystal-induced scattering, with an edge face, the glazing having:
- a first glass sheet with a (main) face referred to as the first inner face and another (main) face referred to as the first outer face (opposite the inner face) and an edge referred to as the first edge,
- a second glass sheet with a (main) face referred to as the second inner face and another (main) face referred to as the second outer face (opposite the inner face) and an edge referred to as the second edge,
- the first and second glass sheets, especially float glass sheets, being sealed (at the border of their inner faces) by a (peripheral) sealing gasket,
- first and second electrodes respectively on the first and second inner faces, in the form of transparent electrically conductive layers, which first and second electrodes are provided respectively with first and second electricity supply zones,
- and, on the first and second electrodes, a layer of liquid crystals alternating reversibly between a transparent state and a translucent state by application of an alternating electric field, which layer has a thickness between 15 and 60 μm inclusive of these values and incorporates spacers, preferably spherical, transparent spacers, in particular made of plastic or even of glass,
- the first glass sheet protruding from one side of the second edge by a first (main) side of the first inner face, referred to as the first protruding side, and comprising the first electricity supply zone,
- electrical cabling with a first cabling input which is the core of a first cable therefore a sheathless cable zone, in the first electricity supply zone and a second cabling input which is the core of a cable, therefore a sheathless cable zone, in the second electricity supply zone,
- a first electrically insulating polymer material for electrically insulating the first cabling input, and optionally a second electrically insulating polymer material for electrically insulating the second cabling input, identical to or different from the first,
- a third glass sheet laminated by the second outer face with the second glass sheet by a first lamination interlayer made of a first transparent polymer interlayer material, the third glass sheet (and optionally the first lamination interlayer) protruding from the second glass sheet via one (main) side of its inner face, covering the first electrically insulating material, referred to as the first covering side.

The third glass sheet provides mechanical protection of the first cabling input, preventing in particular a possible tearing out of the cable in this zone.

The first electrically insulating material itself reinforces the mechanical strength and the retention of the cabling input on the glass, makes the liquid-crystal glazing safe and is mechanically protected by the first covering side.

The installation of the liquid-crystal glazing is facilitated in particular when the liquid-crystal glazing is slid into a frame.

The liquid-crystal glazing is therefore both mechanically stronger and is made electrically safe.

The first electrically insulating material may preferably completely fill the space between the first covering side and the first protruding side.

The first covering side may cover all or part of the first protruding side.

The diameter of the cabling input may be at least 0.3 mm, or even at least 1 mm.

The width of the first protruding side may be at least 3 mm, or even at least 10 mm.

The width of the first covering side may be at least 3 mm, or even at least 10 mm, and may be identical to that of the first protruding side. The edge of the first glass sheet along the first cabling input is then substantially coplanar with the edge of the third glass sheet.

To strengthen the mechanical protection of the glazing, the liquid-crystal glazing may comprise a fourth glass sheet laminated by the first outer face with the first glass sheet by a second lamination interlayer made of a transparent interlayer polymer material, in particular based on ethylene/vinyl acetate, polyvinyl butyral or polyurethane and that is preferably identical to the first interlayer material.

As a standard lamination interlayer, mention may be made of the polyurethane (PU) used flexible, a plasticizer-free thermoplastic such as the ethylene/vinyl acetate (EVA) copolymer, polyvinyl butyral (PVB), a copolymer of polyethylene and of acrylate for example sold by Dupont under the name Butacite or sold by Solutia under the name Saflex. These plastics have, for example, a thickness between 0.2 mm and 1.1 mm, in particular 0.38 mm and 0.76 mm inclusive of these values.

As other plastics, use may also be made of polyolefins such as polyethylene (PE), polypropylene (PP), polyethylene naphthalate (PEN) or polyvinyl chloride (PVC) or ionomer resins.

In order to meet building standards, lamination is thus preferably carried out with PVB which performs better than PU and EVA at the same thickness.

It is also possible to choose to use 0.8 mm of ionomer resin sold under the name Sentriglass by Dupont.

This double lamination also enables the glazing to be classified as:
  safety glazing according to the standards EN12600 (tests that simulate a person falling) and the standard NF DTU039, if the glass is mounted with clamping on four sides,
  anti-break-in glazing according to the standard EN356.

The glazing may also be protected from ultraviolet rays by the addition of additives to the interlayer materials.

All the glass sheets preferably have the same shape (curved or cornered).

To further reinforce the robustness of the liquid-crystal glazing, it is sought to protect the first cable before its connection to the mains (or any other electricity supply).

Thus, in particular instead of making it run along the edge face of the glazing, the electrical cabling comprises a first electrical cable with the first cabling input and which, over at least one portion of its length located beyond the first cabling input, in particular comprising at least one sheath (the inner sheath or even the conventional outer sheath of the cable), is housed in a groove formed:
  between the first and third glass sheets, in particular between the first protruding side and the first covering side,
  and/or
  between another protruding zone of the third glass sheet of the first sheet, referred to as the third zone, and a zone, referred to as the fourth zone, of a fourth glass sheet laminated by the first outer face with the first glass sheet by a second lamination interlayer made of a transparent interlayer polymer material.

The groove or grooves protect and form a cable guide.

The cable may be flush with the groove or be entirely within the groove.

The insertion into the groove also makes it possible to have a more compact glazing, to prevent a local overthickness.

Various cabling configurations (one or more cables) may be envisaged along a single (lateral or longitudinal) side of the glazing or over two adjacent or opposite sides of the glazing.

The height of the peripheral groove between the protruding side and the covering side (corresponding substantially to the thickness of the second glass sheet) may be at least 3 mm approximately.

The height of the peripheral groove between the third and the fourth glass sheets (corresponding substantially to the thickness of the first and second glass sheets) may be at least 6 mm approximately.

It may also be desired to immobilize the electrical cabling—in a groove of the glazing and/or against its edge—and prevent it from being torn out.

Therefore, the electrical cabling may comprise a first electrical cable with the first cabling input and which, over at least one portion of its length located beyond the first cabling input, comprises a sheath, in particular the inner sheath, covered with a support polymer material (or even in direct contact), which material is in particular impermeable to liquid water or even steam and/or is electrically insulating, preferably identical to or even forming the first electrically insulating material, and the sheath preferably being solidified by the support material (sheath preferably embedded in the support material).

A polymer support material is chosen that is sufficiently adherent to the sheath and adherent to the glass, for example a thermoplastic.

EVA has, for example, a good adhesion to the glass and to a sheath made of polyvinyl chloride (PVC) unlike a fluorinated (Teflon, etc.) sheath.

This polymer support material may be an adhesive.

The thickness of the polymer support material is, for example, substantially equal to the diameter of the cable, for example of the order of 5 mm, especially if the cable is along the edge face of the glazing.

If a length of electrical cabling is against the edge face of the glazing, the support material fixes this length of cabling against the edge face.

If a length of electrical cabling is in a groove of the glazing, this support material may completely fill the groove at least over the portion thereof more external than the cable.

This support material also improves the mechanical strength and the positioning of the cable, facilitates installation of the glazing especially when the glazing is slid into a frame.

Preferably, the cabling is covered all along the glazing by this material (before the exit thereof for connection to the mains).

It is also possible to hide the cabling by the support material chosen to be opaque, for example milky white, by addition if necessary of additives to the support material.

Advantageously, the electrical cabling may comprise a first electrical cable with the first cabling input and fixed in a given unidirectional, in particular linear, position, in particular along the edge face or a peripheral groove of the glazing, leaving the glazing or even starting from outside of the first cabling input with the first electrically insulating material.

The unidirectional character may be facilitated:
  by the first electrically insulating material which may initiate a favored direction from the cabling input zone,
  and/or by the support material that solidifies the cable,
  and/or its insertion into a groove of the glazing (force fitting).

It is thus preferred not to form a U shape (and preferably an L shape) even after a connection to the general electricity supply (mains, etc.).

This thus prevents any deterioration of the cable by bending, during transport, or installation, and also deinstallation (repair, etc.).

Therefore, in a first unidirectional configuration, the electrical cabling comprises a (single) first cable, the input of which is level with the side capable of being, after assembly of the glazing, the upper or respectively lower side (position relative to the ground) of the edge face of the glazing or of a peripheral groove of the glazing, starting from outside of the first cabling input with the first electrically insulating material, this first cable is unidirectional, toward the (general) electricity supply, in particular toward the ceiling or floor, respectively.

Therefore, in a second unidirectional configuration (alternative or cumulative), the electrical cabling comprises a (single) first cable, the input of which is level with the side capable of being, after assembly of the glazing, the lateral side of the edge face of the glazing or of a peripheral groove of the glazing, starting from outside of the first cabling input with the first electrically insulating material, the cable is unidirectional.

In cornered glazing, the lateral side is vertical after assembly, and may be either longer, equal to or shorter than the horizontal side.

Preferably, the cable follows a single side.

To simplify the connection, the electrical cabling may preferably exit from the glazing, in particular without coverage by the first electrically insulating material, in a single zone, especially a zone of a single side of the edge face, and preferably the cabling consists of a single first electrical cable which is a two-wire cable.

To extend the electrical and mechanical protection of the glazing, the first electricity supply zone may comprise a first current feed to which the first cabling input is attached and which is covered with the first covering side and optionally protected by the first electrically insulating material.

The first current feed (commonly referred to as a busbar) is for example an electrically conductive strip in the form of a flexible copper foil attached to the first electrode along the side.

To further improve the reliability of the glazing, it may comprise a seal impermeable to liquid water or even to steam, outside of the sealing gasket and formed by an impermeable polymer material, in particular that is electrically insulating, the impermeable seal being arranged for the impermeability of the first cabling input and preferably of an optional first current feed, and (over all or some) of the first electrode in the zone exterior to the sealing gasket.

The impermeable polymer material according to the invention adheres sufficiently to the glass sheets and if necessary to the first interlayer material. It is not necessary either to add (thin) tie layer(s) to the surface of glass sheet(s) to strengthen the adhesion.

The impermeable polymer material therefore guarantees the impermeability to liquid water, or even to steam, in particular very strict impermeability in wet environments (bathroom, etc.).

As applications in a wet (floodable, etc.) zone, mention may be made of:
  a wet room (separate or being part of a bedroom or any other room), a laundromat, a laundry room, in a bathroom, a shower, in particular as floor, wall, partition, door (optionally sliding), facade window or internal window,
  a swimming pool, (floor) tile, wall, window, changing room,
  a building facade (store window, window, especially a street-level or garden-level window) in floodable zones, etc.,
  road, municipal or coastal signage glazing, in floodable zones etc., in a road close to or by the sea, a river, a stream, etc.,
  a boat.

In a preferred design, the impermeable material also forms the first electrically insulating material.

The impermeable seal may be along at least one side of the first edge face and/or along a peripheral groove made in the glazing, in particular between the first protruding side and the first covering side.

Preferably, the seal that is impermeable to liquid water, or even to steam, is also arranged for the impermeability of the second cabling input, and preferably of an optional current feed of the second electrode and (over all or part) of the second electrode in the zone exterior to the sealing gasket.

In one advantageous design, in order to guarantee the complete impermeability of the liquid-crystal glazing, the water-impermeable seal is over the entire perimeter of the glazing:
  and is against the edge face of the glazing, in particular for a protection of the corners of glass sheet(s),
  and/or is in one or more peripheral grooves made in the glazing, in particular to prevent a local overthickness (and a thickness of seal over the edge face).

The water-impermeable seal may border, or even optionally cover the electrical cabling, it being possible in particular for the impermeable material to be the support material already mentioned.

The water-impermeable seal may be free of an external, in particular opaque, surround (rigid frame, bead, joinery, etc.).

The water-impermeable seal may provide a satisfactory finish, necessary for edge-to-edge installation and installations of the glazing in doors. Furthermore, the seal may dampen shocks, in particular protecting the corners of the glazing.

A transparent impermeable material, such as for example EVA, may be preferred, especially if the seal is visible, for example in door applications.

The width (cross section) of the seal that is impermeable to liquid water is not necessarily identical over the entire perimeter.

Furthermore, in one design of the invention, the cabling input is along the edge face, the support material may be formed from the first interlayer film protruding from the third glass sheet (in particular folded so as to surround the cabling).

For the first electrically insulating material and/or the impermeable material and/or a support material for the electric cabling, a material that adheres to the glass is chosen, for example a thermoplastic.

The first electrically insulating material and/or the impermeable material of the seal which optionally forms the first electrically insulating material and/or the support material for the electric cabling may advantageously be transformed (that is to say shaped, in particular by softening, adhesive bonding, liquefaction and preferably crosslinking) via a thermal cycle, in particular in an oven or by simple heating. This transformation is preferable:
  to an extrusion, complicated to implement in production with no guarantee of adhesion to the glass,
  or else to the use of a hot-melt adhesive applied hot with a gun, with no guarantee of adhesion to the glass.

The first electrically insulating material may be made of ethylene/vinyl acetate (moldable material) or else of silicone, in particular to provide impermeability to liquid water or even steam.

The first electrically insulating material may also finally be made of thermosetting resin, in particular epoxy resin, preferably using the same material as the sealing gasket and also providing impermeability to liquid water, or even steam.

The first electrically insulating material may be made of polyurethane or polystyrene (which are moldable) or else of polyvinyl butyral or ionomer resin, without however providing a water-impermeability function.

It is also possible to choose all these materials (ethylene/vinyl acetate, silicone, epoxy resin, polyurethane, polystyrene, polyvinyl butyral, ionomer resin) for the support material of the electric cabling.

Preferably, the impermeable material which optionally forms the first electrically insulating material and/or which optionally forms a support material for the electric cabling is crosslinked, in particular to form a three-dimensional network in order to reinforce the impermeability to liquid water, or even steam.

Preferably, the first electrically insulating material and/or the impermeable material and/or a support material for the electric cabling may be made of silicone or based on ethylene/vinyl acetate, in particular crosslinked by agents such as organic peroxide.

EVA in particular adheres well to the glass as already indicated.

As already seen, the first interlayer material may be an assembling organic polymer, in particular thermoplastic polymer, of ethylene/vinyl acetate (EVA) or polyvinyl butyral (PVB) or polyurethane (PU) type, the first plastic interlayer material optionally being in contact with the first electrically insulating material and/or the impermeable material of the seal and/or the electric cabling support material.

The first interlayer material may advantageously be transformed by a thermal cycle like the first electrically insulating material and/or the impermeable material and/or the cabling support material:

by successive transformations of these materials during different thermal cycles (in particular in an oven), or advantageously simultaneous transformation of these materials (simultaneous or concordant phases of softening, adhesive bonding, liquefaction or preferably crosslinking) during one thermal cycle (in particular in an oven).

The first electrically insulating material and/or the impermeable material of the seal which optionally forms the first electrically insulating material and/or a support material for the electric cabling may have a surface, referred to as the outer surface, oriented toward the outside of the glazing, which is molded.

The external surface may be flat, smooth or intentionally grooved, or serrated. It may form a profile, in particular to reduce the amount of material used, by being curved toward the outside for example.

The first protruding side may be obtained by offsetting the first and second edge faces or by partial cutting of the second edge face.

The second glass sheet may protrude over an edge face side of the first glass sheet by a side of the second inner face referred to as the other protruding side, comprising the second electricity supply zone, and in that the glazing comprises:

a second electrically insulating polymer material for electrically insulating the second cabling input, identical to or different from the first electrically insulating material, a fourth glass sheet laminated by the first outer face with the first glass sheet by a second lamination interlayer made of a transparent polymer material, the fourth glass sheet (and optionally the second lamination interlayer) protruding over the first glass sheet, by one side of its inner face, covering the second electrically insulating material, referred to as the other covering side.

The first protruding side may extend over a limited portion of the first side of the first inner face, the protrusion being obtained by partial cutting of the second edge face. And preferably the second glass sheet may protrude over one side of the first edge face, by a side of the second inner face referred to as the other protruding side, comprising the second electricity supply zone, and extending over a limited portion of one side of the second inner face, the protrusion being obtained by partial cutting of the first edge face, and preferably the first protruding side and the other protruding side are on one and the same side of the glazing.

The liquid-crystal glazing is thus further simplified by forming first and second electricity supply zones that are close together and/or in addition this may limit the length of cabling necessary. However enough space is left between them to prevent connections, for example soldered connections, between cable inputs and external parts from becoming hot.

Preferably, the ends of the first and second cabling inputs are spaced apart by a length, referred to as a separation length, measured along the main plane of the glazing, which is greater than or equal to 10 cm, or even greater than or equal to 15 cm, in particular less than 30 cm.

For example, in order to bring together the cabling inputs and the optional current feeds on the same side of the cornered (rectangular, square etc.) glazing, each of the first and second glass sheets is cut over half of the width of this side.

Furthermore, the spacers may preferably be made of a hard transparent plastic. The spacers (roughly) determine the thickness of the layer of liquid crystals. For example, spacers made of polymethyl methacrylate (PMMA) are preferred.

The spacers are preferably made of a material having an optical index (substantially) equal to the optical index of (the matrix of) the layer of liquid crystals.

The layer of liquid crystals may be based on liquid crystals of various types.

For the liquid crystals, use may specifically be made of all the liquid-crystal systems known under the terms NCAP (Nematic Curvilinearly Aligned Phases) or PDLC (Polymer Dispersed Liquid Crystal) or CLC (Cholesteric Liquid Crystal) or NPD-LCD (Non-homogeneous Polymer Dispersed Liquid Crystal Display).

These may in addition contain dichroic dyes, in particular in solution in the liquid-crystal droplets. It is then possible to jointly adjust the light scattering and the light absorption of the systems.

It is also possible to use, for example, gels based on cholesteric liquid crystals that contain a small amount of crosslinked polymer, such as those described in patent WO 92/19695. More broadly, PSCT (Polymer Stabilized Cholesteric Texture) systems can therefore be chosen.

In particular, use may be made of bistable smectic liquid crystals, for example as explained in detail in patent EP 2 256 545, which switch under the application of an alternating electric field in pulsed form and which remain in the switched state until the application of a new pulse.

The liquid-crystal system may be discontinuous, in several pieces (for example of pixel type).

In the wet zones as elsewhere, the glazing according to the invention may (also) be used:

as an internal partition (between two rooms or in a space) in a building, in a land-based aerial or nautical means of transportation (between two compartments, in a taxi, etc.), as a glazed door, a window, a ceiling or tiling (floor, ceiling), as a side window or roof of a land-based, aerial or nautical means of transportation, as a projection screen, as a store window or display case, in particular of a counter.

Naturally, the glazing according to the invention may form all or part of a partition and other window (transom, etc.) of a multiple glazing (by adding additional glazing).

Another subject of the present invention is a process for a multiple glazing with variable liquid-crystal-induced scattering as described previously comprising the following steps in this order:

before or after forming the sealing gasket, a liquid deposition of a liquid-crystal composition on the first glass sheet provided with a first electrode or even on the second glass sheet provided with a second electrode, assembling the first and second glass sheets so as to form the first protruding side or even the other protruding side, exposure of the liquid crystals to light (in particular ultraviolet light) in order to form the liquid-crystal layer, and also:

a link from the first cabling input to the first electrode in the first electricity supply zone and preferably the link from the second cabling input to the second electrode in the second electricity supply zone, electrical insulation of the first cabling input by the first electrically insulating polymer material, and optionally electrical insulation of the second cabling input by the second electrically insulating polymer material, lamination of the third glass sheet with the second glass sheet by the first lamination interlayer so as to form the first covering side, an optional other lamination of the fourth glass sheet with the first glass sheet by the second lamination interlayer so as to form the other covering side.

Advantageously, the lamination with the first lamination interlayer material, in particular made of PVB (and preferably the other lamination with the second lamination interlayer material, in particular made of PVB) involves placing the glazing in an autoclave.

Plastic that does not require treatment in an autoclave, but for which simple heating suffices, could be preferred so as not to risk degrading the liquid crystals. This is why EVA is preferred for the first electrically insulating material and optionally for the first interlayer plastic, in particular thermoplastic (if a continuity of materials is desired in particular).

However, surprisingly, the Applicant has observed that the optical performances of the liquid-crystal glazing were not degraded by the autoclave since, unexpectedly, the spacers maintain the thickness of the liquid-crystal layer, the autoclave for example being necessary for lamination with PVB. PVB also enables optimal mechanical strengthening of the glazing in the case of double lamination and EVA can be transformed during the lamination by PVB.

In one preferred embodiment, said electrical insulation comprises:

an insertion of the first electrically insulating material, —in particular that is solid, in any form, in particular strip, bead, granule, or even powder—, over the first protruding side, placing a mold opposite, or even in contact with, the first edge face and the third edge face and with an inner molding surface opposite a groove between the first protruding side and the first covering side including the first electrically insulating material, heating (for example under vacuum) that fluidizes the first electrically insulating polymer material, in particular made of EVA, so that the first electrically insulating material adopts the inner molding surface and fills the groove.

The molding makes it possible to choose as required the dimensions and shape of the electrically insulating material.

With the mold, the electrically insulating polymer material will indeed spread controllably. Thus, the distribution of the material is defined by using a mold having a shape complementary to the shape desired for the electrical insulation, or even for the impermeability, and/or the mechanical protection of the cabling.

The mold preferably has a height greater than the total height of the glazing (in other words the total thickness of the glazing).

EVA has sufficient flowability and is preferably crosslinkable (by insertion of crosslinking agent(s)) during and/or starting from treatment in an oven.

Advantageously, said heating may also fluidize the first interlayer material, in particular made of EVA (and the second interlayer material, in particular made of EVA) in order to achieve said lamination (and preferably the other lamination), preferably during the same thermal cycle, and optionally the first electrically insulating material comes into contact with the first interlayer material, in particular on the first covering side.

When the molding is prior to the lamination, the mold is preferably kept (or another suitable element is placed) on the perimeter of the glazing during the lamination because if the interlayer plastic, in particular thermoplastic, overflows, it is then contained in the mold (or another suitable element).

The first and third glass sheets may be shifted uncontrollably (not desired) during the assembly. This creates a dimensional disparity which is problematic for the installation and may even lead to the glazing being scrapped.

When the molding is prior to the lamination, the mold is kept on the perimeter of the glazing during the lamination in order to eliminate this drawback.

Indeed, by encircling the glazing with the mold, the first and third glass sheets are realigned when their edges butt up against the mold.

Thus:

the shifting of the glass sheets is limited, the side finish will be selectively controlled depending on the shape of the mold (square, rounded, etc.), an attractive finish is guaranteed.

Preferably, for its retention, the mold may press against the glazing at least via a main outer face of the glazing and optionally may butt up against the first edge and the third edge and/or the mold, in one or more parts, encircles the perimeter of the glazing.

The mold may be supported by the two main outer faces of the glazing or the mold (for example with an L-shaped section) may be pressed only against one side of one of the main outer faces of the glazing and a cover (textile, etc.) is placed on one side of the other main outer face of the glazing and extends over the mold.

The electrically insulating polymer material is easily inserted between the mold and the side of the first sheet.

In addition, one and the same open mold (L-shaped, etc.) may be used for different glass thicknesses, therefore the stock of molds is simple to manage.

For molding on two opposite sides, it is possible to use a mold for example made of two spaced apart parts. For molding on two adjacent sides, it is possible to use a mold for example made of one part or made of first and second parts. For example, the first part and the second part each having a free lateral end and a lateral end butted up against a lateral end of the other part.

For complete molding over the four sides, the mold may be made of four parts, for example each with one free lateral end and an end butted up against an end of another adjacent part.

The molding height may be identical or different for a side with electricity supply or a side with a supported cable or a side with neither cable nor electricity supply. The mold is thus constantly adapted.

By designing the mold appropriately, it is possible to create an additional space beyond the glass. This makes it possible to:

solidify the cabling input and even all of the cabling (improving the resistance to being torn out), guide the cabling in one direction.

The process may comprise an immobilization of the first electric cable (before the connection thereof, and the exiting thereof from the glazing) or even of a possible second electric cable (before the connection thereof, and the exiting thereof from the glazing) preferably including an insertion of the support material, —which is preferably solid, in any form, in particular strip, bead, granule, or even powder—on the first cable and in the mold, which is monolithic or made of several parts, the heating fluidizing the polymer support material, in particular made of EVA, so that the support material adopts the molding surface and solidifies the first electrical cable, in particular a two-wire cable, or even the second electrical cable.

The process may comprise a formation of the seal that is impermeable to liquid water, or even steam, external to the sealing gasket preferably including an insertion into the mold of the impermeable material, —which is preferably solid, in any form, in particular strip, bead, granule, or even powder—, of the first cabling input, of the first electrode, of the optional first current feed, or even of the second cabling input, the second electrode, of the optional second current feed, the heating fluidizing the impermeable polymer material, in particular made of EVA, so that the support material adopts the molding surface and adheres to the glass, the formation of the impermeable seal preferably including the immobilization of the first electric cable.

For the passage of the cabling, the mold comprising the support material may be open or pierced with one or more holes on its wall opposite the edge face of the glazing so as to let the cabling exit and/or the mold may be open laterally on at least one side so as to let the first cable exit and preferably the lateral edges of the mold are obstructed, in particular by fabric or adhesive tape.

To simplify and shorten the manufacture, the electrical insulation, the immobilization of the first cable and/or the formation of the impermeable seal, especially with the mold, may comprise a step of simultaneous heating, preferably starting with a single material, preferably EVA.

The invention finally provides a mold for the implementation of the process for manufacturing the multiple glazing with variable liquid-crystal-induced scattering defined previously.

The mold may have a non-stick molding surface to which the first electrically insulating polymer material, in particular selected from Teflon or silicone, does not adhere.

The mold may have a cross section that is:

L-shaped as has already been seen, or C-shaped: the protective material will have a (symmetrical) C-shape with smoother corners.

With a groove between the glass sheets, it is possible to insert the cabling into this groove. Optionally, the molding surface is then between the inner faces of the glass sheets, which offers several advantages:

it eliminates the risk of creep in the protruding glass sheets, it makes it possible to obtain a non-protruding protective material (for example flush with the edge face), it reinforces the protection of the cabling, it reduces the lateral dimension of the glazing.

Figure 1B:
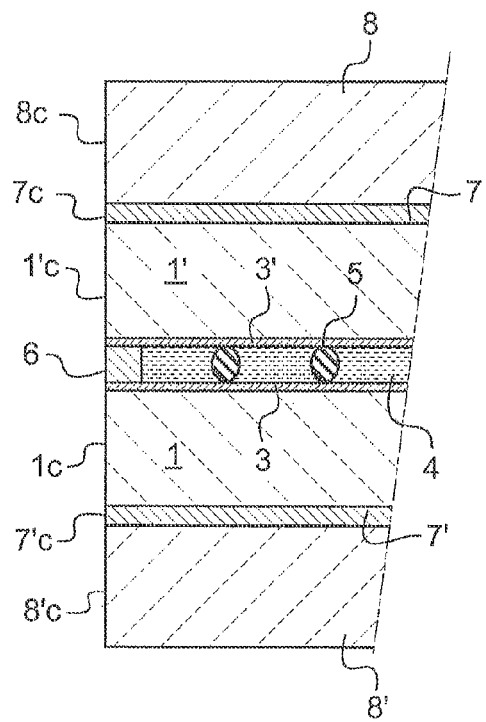
Figure 2A:
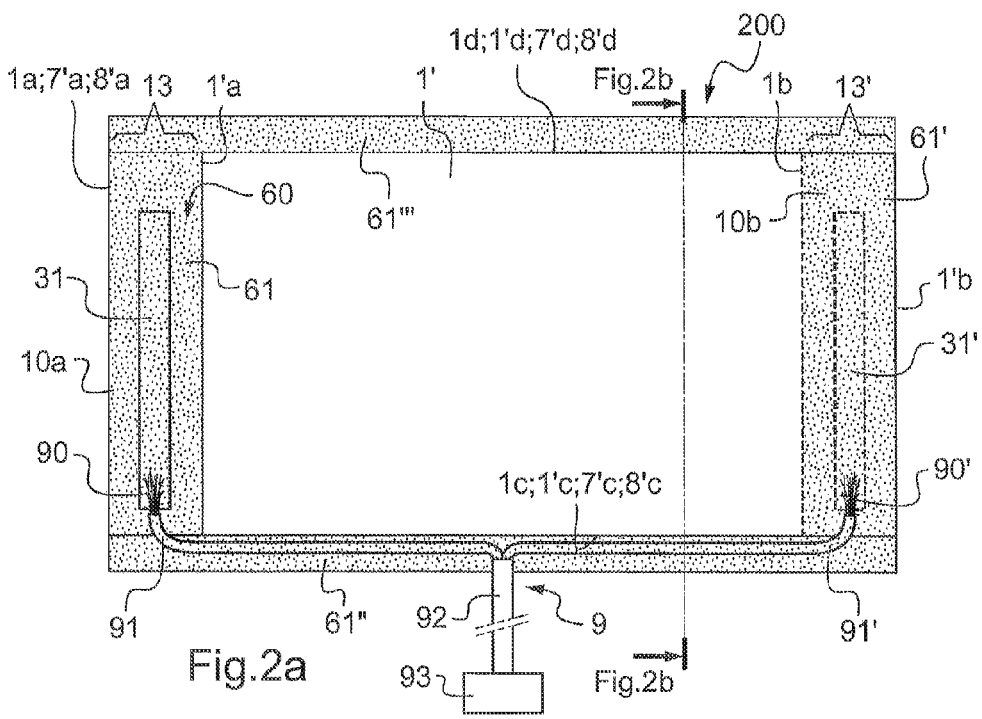
Figure 2B:
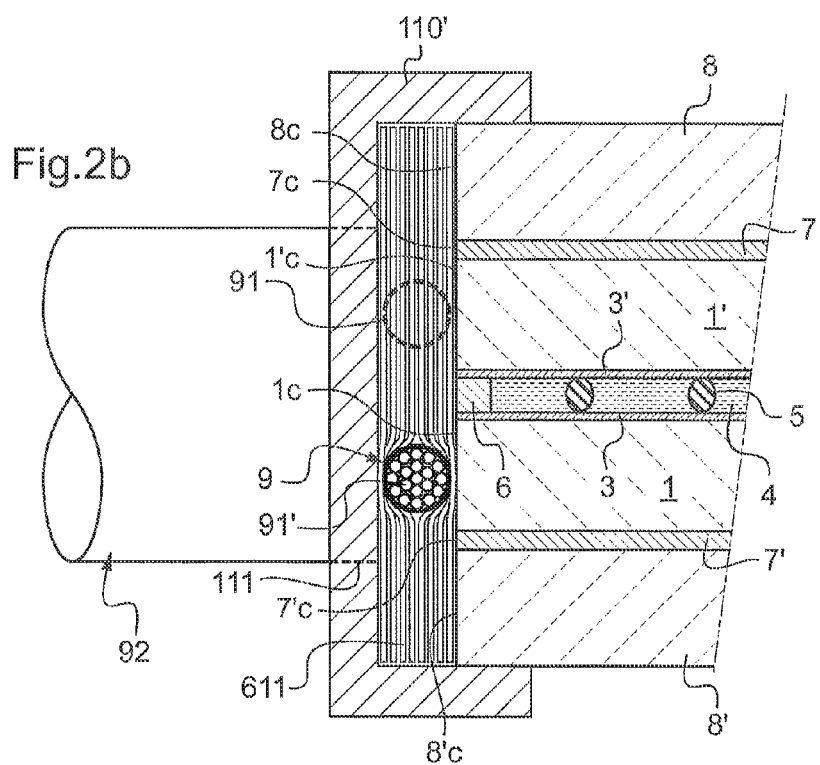

Other details and features of the invention will become clear from the detailed description that follows, given with regard to the appended drawings in which:

FIG. 1a represents a schematic cross-sectional view of a first embodiment of the multiple glazing with variable liquid-crystal-induced scattering according to the invention, FIG. 1b represents a partial and schematic cross-sectional view of the multiple glazing with variable liquid-crystal-induced scattering from FIG. 1, FIG. 1c represents a schematic top view of the multiple glazing with variable liquid-crystal-induced scattering from FIG. 1a, FIG. 1d represents a partial and schematic cross-sectional view of the multiple glazing with variable liquid-crystal-induced scattering from FIG. 1a during manufacture, FIG. 2a represents a schematic top view of a second embodiment of the multiple glazing with variable liquid-crystal-induced scattering according to the invention, FIG. 2b represents a schematic and partial cross-sectional view of the multiple glazing with variable liquid-crystal-induced scattering from FIG. 2a during manufacture, FIG. 2c represents a schematic and partial cross-sectional view of the multiple glazing with variable liquid-crystal-induced scattering from FIG. 2a, FIG. 3a represents a schematic top view of a third embodiment of the multiple glazing with 0.15 variable liquid-crystal-induced scattering according to the invention, FIG. 3b represents a schematic and partial cross-sectional view of the multiple glazing with variable liquid-crystal-induced scattering from FIG. 3a during manufacture, FIG. 3c represents a schematic and partial cross-sectional view of the multiple glazing with variable liquid-crystal-induced scattering from FIG. 3a, FIG. 4a represents a schematic cross-sectional view of a fourth embodiment of the multiple glazing with variable liquid-crystal-induced scattering according to the invention, FIG. 4b represents a schematic and partial top view of the multiple glazing with variable liquid-crystal-induced scattering from FIG. 4a, FIG. 5 represents a schematic top view of a fifth embodiment of the multiple glazing with variable liquid-crystal-induced scattering according to the invention.

For the sake of clarity it is specified that the various elements of the objects represented are not necessarily reproduced to scale.

FIG. 1 represents a schematic cross-sectional view of a first embodiment of the multiple glazing with variable liquid-crystal-induced scattering according to the invention with:

a first glass sheet 1' that is rectangular—defining four sides—, with one face referred to as the first inner face 11 and another face referred to as the first outer face 12 and an edge referred to as the first edge 1a to 1d, a second glass sheet that is rectangular—defining four sides—, with one face referred to as the second inner face 11' and another face referred to as the second outer face 12' and an edge referred to as the second edge 1'a to 1'd.

The first glass sheet 1 protrudes from one side of the second edge 1'a, via a first side 13 of the first inner face 11, referred to as the first protruding side 13. For example, it is a first lateral (or as a variant longitudinal) side.

The second glass sheet 1' protrudes from an edge side of the first glass sheet 1b, via one side of the second inner face referred to as the other protruding side 13'. For example, it is the second lateral (or as a variant longitudinal) side.

The first protruding side 13 and the other protruding side (here opposite) are obtained by offsetting the first and second edges 1a, 1'a.

Positioned on each of the first and second sheets of float glass 1 and 1', on the inner faces 11, 11', is an electrically conductive layer 3, 3' having a thickness of around 20 to 400 nm, made from indium tin oxide (ITO) for example. The ITO layers have an electrical surface resistance between 5Ω/□ and 300Ω/□. Instead of layers made of ITO, it is also possible to use, for the same purpose, other electrically conductive oxide layers or silver layers, the surface resistance of which is comparable.

The layer 4 of liquid crystals, which may have a thickness of around 15 to 60 μm, is located between the electrode layers 3 and 4.

The layer 4 of liquid crystals contains spherical spacers 5. The spacers 5 consist of a transparent hard polymer. By way of example, the product from Sekisui Chemical Co., Ltd., known under the name Micropearl SP has proved very suitable as a spacer, made of polymethyl methacrylate (PMMA).

Furthermore, for the layer of liquid crystals, it is also possible to use known compounds, for example the compounds described in document U.S. Pat. No. 5,691,795. The liquid-crystal compound from Merck Co., Ltd., sold under the trade name Cyanobiphenyl Nematic Liquid Crystal E-31 LV has also proved to be particularly suitable. In the case of this embodiment, this product is mixed in a ratio of 10:2 with a chiral substance, for example 4-cyano-4'-(2-methyl)butylbiphenyl, and this mixture is mixed in the ratio of 10:0.3 with a monomer, for example 4,4'-bisacryloylbiphenyl, and with a UV initiator, for example benzoin methyl ether. The mixture thus prepared is applied to one of the coated glass sheets. After curing the layer of liquid crystals by irradiation with UV light, a polymer network is formed in which the liquid crystals are incorporated.

As a variant, the layer of liquid crystals does not contain a stabilizing polymer but solely consists of the mass of liquid crystals and spacers. The mass of liquid crystals is therefore applied as is without a monomer additive, at a thickness of 3 to 20 μl on one of the glass sheets 1, 1'. Compounds for the layers of liquid crystals of this type are described, for example, in document U.S. Pat. No. 3,963,324.

For the layer of liquid crystals, it is possible to use PDLCs such as the compound 4-((4-ethyl-2,6-difluoro-phenyl)ethynyl)-4'propylbiphenyl and 2-fluoro-4,4'-bis(trans-4-propylcyclohexyl)biphenyl for example sold by Merck under the reference MDA-00-3506.

Over the side, the layer of liquid crystals is sealed by an adhesive sealing gasket 6 which is used at the same time to join the glass sheets 1, 1' provided with electrodes 3, 3' in a firm and permanent manner. The adhesive sealing material which seals the separate glass sheets 1 and 1' over their sides contains an epoxy resin.

In addition, this glazing 100 comprises first and second electricity supply zones:
for a first current feed, a first electrically conductive strip 31 in the form of a flexible copper foil (commonly referred to as a busbar) attached to the first electrode, along the first protruding side 13,
for a second current feed, a second electrically conductive strip 31' in the form of a flexible copper foil attached to the second electrode, along the other protruding side.

The glazing 100 then comprises electrical cabling with two cables 9, 9' and therefore two cabling inputs: a first cabling input 90 which is a sheathless core of a first cable 9 welded to the first current feed 31 and a second cabling input 90' which is the sheathless core of a second cable 9' welded to the second current feed 31'.

The first cabling input 90 is insulated by an electrically insulating polymer material 61, here chosen to be EVA.

The second cabling input 90' is insulated by an electrically insulating polymer material 61', here chosen to be EVA.

A third glass sheet 8 which is rectangular, having a thickness for example between 2 mm and 4 mm (inclusive of these values) is laminated by the second outer face 12' with the second glass sheet 1' by a first lamination interlayer 7 made of a first transparent polymer interlayer material, here 0.38 m of polyvinyl butyral.

The third glass sheet 7 and the first lamination interlayer 8 protrude from the second glass sheet 1', via one side of its inner face, covering the first electrically insulating material 61, referred to as the first covering side 83.

A first peripheral groove 10a is thus formed between the first protruding side 13 and the first covering side 83. Along this first side 13, the edges of the glass sheets and interlayers 1a, 7'a, 8'a, 7a, 8a are aligned.

Similarly, a fourth glass sheet 8' which is rectangular, having a thickness for example between 2 mm and 4 mm (inclusive of these values) is laminated via the first outer face 12 with the first glass sheet 1 by a second lamination interlayer 7' made of a transparent polymer material, here 0.38 m of polyvinyl butyral.

The fourth glass sheet 7' and the second lamination interlayer 8' protrude from the first glass sheet 1, via a side of its inner face, covering the second electrically insulating material, referred to as the other covering side 83' on the opposite side from the first covering side.

A second peripheral groove 10b is thus formed between the other protruding side 13' and the other covering side 83'.

Along this first side 13', the edges of the glass sheets and interlayers 1b, 7'b, 8'b, 7b, 8b are aligned.

As shown in FIG. 1b, along the two other adjacent sides, here the longitudinal sides, all the edges of the glass sheets and interlayers 1c, 1'c, 7c, 8c, 7c, 7b, 8c are aligned.

The first cabling input 90 is fixed in a given unidirectional, in particular linear, position, leaving the glazing or even starting from outside of the first cabling input 90 with the first electrically insulating material 91.

First and second cables 9, 9', for example having cores 90, 90' with a cross section equal to 0.6 mm² and a total diameter with the inner sheath 91, 91' of 2 mm are chosen. The total diameter with the outer sheath 92, 92' is 5.5 mm. The cables are connected to the mains 93, 93' while exiting the glazing 100.

As shown in FIG. 1d, the electrical insulation of the first cabling input 90 (respectively of the second cabling input 90) is carried out before the lamination.

After the positioning of the first lamination interlayer 7 and of the third glass sheet 8 (respectively of the second lamination interlayer and of the fourth glass sheet), the thermoplastic polymer material made of EVA which is preferably crosslinkable 610 by agents such as organic peroxide is inserted, in the form of strips—or as a variant beads—, into the first groove 10a (respectively the second groove 10b). The width of the strips depends on the thickness of the glass sheets used. For example, strips of EVA having a thickness of 0.4 mm are placed in order to cover the first input of the stripped cable 90 (respectively the second input 90').

Use is then made of a mold 110 having an inner surface referred to as a molding surface. The mold 110, having a (substantially) C-shaped cross section, is:
pressed against the glazing by the main outer faces of the third and fourth glass sheets 8, 8';
butted up against the edge faces of the glass sheets 1a, 8a, 8'a or even of the interlayers 7a, 7'a or as a variant with a space in order to cover the edge faces 1a, 8a with molded EVA (by possible steps internal to the mold).

The mold 110 has an (inner) molding surface to which EVA does not appear, for example made of Teflon.

The mold 110 is open laterally on one side to allow the first cable 9 to exit. In order to contain the EVA, the lateral sides of the mold are closed off or obstructed, in particular with fabric or adhesive tape (not shown).

The mold 110, as a variant, has a side wall that is pierced to allow the first cable to exit.

As a variant of the installation, the strips of EVA are put in place (just) before positioning the first lamination interlayer 7 and the third glass sheet 8.

For the second cabling input 90', a similar molding part is used and the same procedure is followed.

The assembly of glazing and mold(s) is placed in a simple vacuum-sealed chamber which is pumped to a rough vacuum in order to degas the EVA (removal of bubbles, etc.) and heated above 100° C. to fluidize the EVA polymer material so that the EVA material adopts the molding surface and in order to start the crosslinking of the EVA.

With this EVA, the means of impermeability to liquid water of the first and second cabling inputs 90, 90' is formed at the same time. As shown in FIG. 1*c*, the grooves 10*a* and 10*b* are not filled with EVA outside of these zones. For greater clarity, the top views of all the examples do not show the third glass sheet 8 and the first lamination interlayer 7.

The EVA polymer material 61 fills the space remaining in the first peripheral groove 10*a* between the molding surface and the side 1'*a* and comes into contact with the PVB 7. Similarly, the EVA polymer material 61' fills the space remaining in the second peripheral groove 10*b* between the molding surface and the side 1*a* and comes into contact with the PVB 7'.

In one variant that is not represented, the strips of EVA are removed, the film 7 (respectively the film 7') then chosen to be made of EVA is made to protrude in order to insulate the first cable input (respectively the second cable input).

In another variant, double lamination is carried out and then the strips of EVA are inserted and the mold is put in place before a suitable heating.

FIG. 2*a* represents a schematic top view of a second embodiment of the multiple glazing with variable liquid-crystal-induced scattering 200 according to the invention.

The glazing 200 differs from the glazing 100 firstly by the formation of a seal that is impermeable to liquid water made of EVA encircling the glazing, impermeability to liquid water:
- of the first current feed 31 and of the first electrode in this supply zone, seal 61 filling the whole of the first groove 10*a*,
- of the second current feed 31' and of the second electrode in this supply zone, seal 61' filling the whole of the second groove 10*b*,
- of a first longitudinal side, seal 61" along the edge face of the glazing 1*c*, 1'*c*, 8*c*, 8'*c* (see also FIG. 2*c*),
- of a second longitudinal side, seal 61''' along the edge face of the glazing 1*d*, 1'*d*, 8*d*, 8'*d*.

Over the first longitudinal side, like over the second longitudinal side, the sealing gasket may be spaced apart from the first and second edge faces 1, 1' optionally leaving the first and second electrodes protruding. Therefore, the gasket protects the entire outer surface of the electrodes from corrosion.

In addition, the cabling 9 comprises a single two-wire cable 90, 90' along the first longitudinal side of the glazing 200. The EVA immobilizes the two inner sheaths 91, 91'. The electrical cable is fixed in a given unidirectional, linear position on exiting the glazing. The cable exits the glazing, in a single zone before connection to the mains 93.

The molded EVA 61 has a smooth outer surface.

The impermeability to liquid water is qualified by determining the second figure of the protection index (IP).

The protection index (IP) is an international standard of the Internal Electrotechnical Commission. This index classifies the level of protection that a material offers against the ingress of solid and liquid bodies. The format of the index, given by the standard CEI 60529, is IP XY, where the second figure Y relates to the level of protection against water under the conditions summarized in Table 1 below.

TABLE 1

| Index | $2^{nd}$ figure for protection against water |
|---|---|
| 0 | No protection |
| 1 | Protected against water droplets falling vertically |
| 2 | Protected against water droplets falling at up to 15° from the vertical |
| 3 | Protected against rain at up to 60° from the vertical |
| 4 | Protected against discharges of water from all directions |
| 5 | Protected against jets of water from all directions from hoses |
| 6 | Protected against large waves |
| 7 | Protected against the effects of immersion |

This coefficient is defined for example in standards DIN40050, IEC 529, BS 5490.

This glazing 200 meets the IPX7 standard, that is to say that the glazing has been shown to operate while completely immersed in water (test described by the standard IEC 60335-1:2002). The immersion is temporary and at a depth of between 0.15 m and 1 m. More specifically, the test was carried out by completely immersing the glazing in water in its manufacture-recommended installation configuration, so that the following conditions are respected:
a) the glazing was horizontal at a depth of 1 m and supplied with electrical power,
b) the test lasted for 30 min,
c) the temperature of the water did not differ from that of the glazing by more than 5 K.

The embedded cable inputs 90, 90' are also stronger. The resistance of the cable to being torn out can be established by the following method.

The cable is marked where it exits the mold and it is subjected to a tensile force of 100 N (10 kg) at a distance of around 20 mm from the cable input. The cable is subjected to a tensile force of 100 N for 1 s without jolting in the least favorable direction. The test is carried out 25 times. Next the cable is subjected to a torsion torque of 0.35 N·m applied as close as possible to the input of the glazing for 1 min. During the tests, the cable must not be damaged, that is to say severed by the torque. The tensile force is again applied and the longitudinal displacement of the cable must not be more than 2 mm.

FIG. 2 represents a schematic and partial cross-sectional view of the multiple glazing with variable liquid-crystal-induced scattering from FIG. 2*a* during manufacture.

The mold 110' differs from the mold 100 in that it encircles the entire perimeter of the glazing and as many strips of EVA as necessary are placed in the grooves 10*a* and 10*b* and strips of EVA 611 along the longitudinal edges in the space between the molding surface and the aligned edge faces 8*c*, 1*c*, 1'*c*, 8'*c*.

The mold 110' is also pierced with one or more holes 111 on its wall opposite the edge face of the glazing to allow the cable to exit.

FIG. 3*a* represents a schematic top view of a third embodiment of the multiple glazing with variable liquid-crystal-induced scattering 300.

The glazing 300 differs from the glazing 200 in that the sides 8c, 8'c of the third and fourth edge faces, associated with the first longitudinal side, protrude from sides 1c, 1'c of first and second edge faces forming a longitudinal peripheral groove 10c housing the two-wire cable 9 (see also FIG. 3c).

As shown in FIG. 3b, the manufacturing process presented differs from the second embodiment in that the mold 120 of L-shaped cross section is open and is therefore only on one side of the main outer face of the third sheet 8. A cover 130 (strip of adhesive-coated fabric for example or strip of fabric attached by adhesive tape) is positioned on one side of the main outer face of the fourth sheet 8' and extends over the mold 120 so as to cap it.

FIG. 4a represents a schematic cross-sectional view of a fourth embodiment of the multiple glazing 400 with variable liquid-crystal-induced scattering according to the invention.

The glazing 400 differs from the glazing 100 in that the first protruding side 13 is obtained by partial cutting of the second edge face 1'a and the other protruding side 13' is obtained by partial cutting of the first edge face 1a.

The first protruding side 13 and the other protruding side 13' are on a single longitudinal side as shown in FIG. 4b.

The first and second peripheral grooves 10a, 10b are completely filled with EVA 61, 61'.

FIG. 5 represents a schematic top view of a fifth embodiment of the multiple glazing 500 with variable liquid-crystal-induced scattering according to the invention.

The glazing 500 differs from the glazing 100 in that the first protruding side 13 is obtained by partial cutting of the second edge face 1'a and the other protruding side 13' is obtained by partial cutting of the first edge face 1a.

The first protruding side 13 and the other protruding side 13' are on longitudinal sides 1a, 1'b and are not opposite each other.

The first and second peripheral grooves 10a, 10b are completely filled with EVA 61, 61'.

The cabling is a single two-wire cable 9 immobilized by EVA 61", 61'" against the edge face of the first longitudinal side and of a second lateral side 1c, 1'c.

The invention claimed is:

1. A multiple glazing with variable liquid-crystal-induced scattering, with an edge face, the multiple glazing comprising:
    a first glass sheet including a first inner face, a first outer face and a first edge,
    a second glass sheet including a second inner face, a second outer face and a second edge,
    first and second electrodes respectively on the first and second inner faces, in the form of transparent electrically conductive layers, which first and second electrodes are provided respectively with first and second electricity supply zones,
    on the first and second electrodes, a layer of liquid crystals adapted to alternate reversibly between a transparent state and a translucent state by application of an alternating electric field,
    a sealing gasket sealing the layer of liquid crystals about its perimeter and also joining the first and second glass sheets together,
    the first glass sheet protruding from one side of the second edge by a first protruding side of the first inner face, and comprising the first electricity supply zone,
    an electrical cabling including a first cabling input in the first electricity supply zone and a second cabling input in the second electricity supply zone,
    a first electrically insulating polymer material configured to electrically insulate the first cabling input, and optionally a second electrically insulating polymer material configured to electrically insulate the second cabling input,
    a third glass sheet laminated by the second outer face with the second glass sheet by a first lamination interlayer made of a first transparent polymer interlayer material, the third glass sheet protruding from the second glass sheet via a first covering side of its inner face, covering the first electrically insulating material, and
    a water-impermeable seal extending about an entire perimeter of the multiple glazing and forming at least the first electrically insulating material.

2. The multiple glazing with variable liquid-crystal-induced scattering as claimed in claim 1, further comprising a fourth glass sheet laminated by the first outer face with the first glass sheet by a second lamination interlayer made of a transparent interlayer polymer material.

3. The multiple glazing with liquid-crystal-induced variable scattering as claimed in claim 1, wherein the electrical cabling comprises a first electrical cable with the first cabling input and which, over at least one portion of its length located beyond the first cabling input, is housed in a groove formed:
    between the first and third glass sheets, in particular between the first protruding side and the first covering side,
    and/or between another protruding zone of the third glass sheet of the first sheet, and a zone of a fourth glass sheet laminated by the first outer face with the first glass sheet by a second lamination interlayer made of a transparent interlayer polymer material.

4. The multiple glazing with liquid-crystal-induced variable scattering as claimed in claim 1, wherein the electrical cabling comprises a first electrical cable with the first cabling input and which, over at least one portion of its length located beyond the first cabling input, comprises a sheath, covered with a supporting polymer material, which material is in particular impermeable to water and is electrically insulating.

5. The multiple glazing with variable liquid-crystal-induced scattering as claimed in claim 1, wherein the electrical cabling comprises a first electrical cable with the first cabling input, the electrical cabling being fixed in a given unidirectional position leaving the glazing.

6. The multiple glazing with variable liquid-crystal-induced scattering as claimed in claim 1, wherein the electrical cabling leaves the glazing in a single zone.

7. The multiple glazing with variable liquid-crystal-induced scattering as claimed in claim 1, wherein the first electricity supply zone comprises a first current feed to which the first cabling input is attached and which is covered with the first covering side and optionally protected by the first electrically insulating material.

8. The multiple glazing with variable liquid-crystal-induced scattering as claimed in claim 1, wherein the water-impermeable seal is a cross-linked material.

9. The multiple glazing with variable liquid-crystal-induced scattering as claimed in claim 1, wherein the first electrically insulating material and/or the water-impermeable material and/or a support material for the electrical cabling is made of silicone or based on ethylene/vinyl acetate, in particular which is crosslinked.

10. The multiple glazing with variable liquid-crystal-induced scattering as claimed in claim 1, wherein the first lamination interlayer is based on ethylene/vinyl acetate, polyvinyl butyral or polyurethane.

11. The multiple glazing with variable liquid-crystal-induced scattering as claimed in claim 1, wherein the water-impermeable seal forming the first electrically insulating material and/or a support material for the electrical cabling has an outer surface, oriented toward the outside of the glazing, which is molded.

12. The multiple glazing with variable liquid-crystal-induced scattering as claimed in claim 1, wherein the first protruding side is obtained by offsetting the first and second edge faces or by partial cutting of the second edge face.

13. The multiple glazing with variable liquid-crystal-induced scattering as claimed in claim 1, wherein the second glass sheet protrudes over an edge face side of the first glass sheet by a second protruding side of the second inner face, comprising the second electricity supply zone, and wherein the glazing comprises:
  the second electrically insulating polymer material configured to electrically insulate the second cabling input, and
  a fourth glass sheet laminated by the first outer face with the first glass sheet by a second lamination interlayer made of a transparent polymer material, the fourth glass sheet protruding over the first glass sheet, by a second covering side of its inner face, covering the second electrically insulating material.

14. The multiple glazing with variable liquid-crystal-induced scattering as claimed in claim 1, wherein the first protruding side extends over a limited portion of the first side of the first inner face, the protrusion being obtained by partial cutting of the second edge face and wherein the second glass sheet protrudes over a side of the first edge face, by a second protruding side of the second inner face, comprising the second electricity supply zone, and extending over a limited portion of one side of the second inner face, the protrusion being obtained by partial cutting of the first edge face, and the first protruding side and the second protruding side are on one and the same side of the glazing.

15. A process for manufacturing a multiple glazing comprising:
  depositing a liquid of a liquid-crystal composition on a first glass sheet provided with a first electrode,
  before or after depositing the liquid of the liquid-crystal composition, forming a sealing gasket that seals the liquid-crystal composition and also joins the first glass sheet to a second glass sheet;
  assembling the first and second glass sheets so as to form a first protruding side, the first protruding side being formed where the first glass sheet protrudes from the second glass sheet;
  curing the liquid crystals in order to form the liquid-crystal layer,
  providing a link from the first electrode to a first cabling input,
  laminating a third glass sheet with the second glass sheet using a first lamination interlayer so the third glass sheet protrudes from the second glass sheet via a first covering side of its inner face,
  forming a water-impermeable seal about an entire perimeter of the multiple glazing, including providing a first electrically insulating polymer material that electrically insulates the first cabling input and is covered by the first covering side of the inner face of the third glass sheet.

16. The process for manufacturing a multiple glazing with variable liquid-crystal-induced scattering as claimed in claim 15, wherein laminating with the first lamination interlayer material includes placing the glazing in an autoclave.

17. The process for manufacturing a multiple glazing with variable liquid-crystal-induced scattering as claimed in claim 15, wherein electrically insulating the first cabling input comprises:
  inserting the first electrically insulating material over the first protruding side,
  placing a mold across a first edge face of the first glass sheet and a third edge face of the third glass sheet such that an inner surface of the mold bounds a groove between the first protruding side of the first glass sheet and the first covering side of the third glass sheet which contains the first electrically insulating material,
  heating to fluidize the first electrically insulating polymer material so that the first electrically insulating material adopts the inner molding surface and fills the groove.

18. The process for manufacturing a multiple glazing with variable liquid-crystal-induced scattering as claimed in claim 17, wherein said heating also fluidizes the first lamination interlayer in order to produce said lamination.

19. The process for manufacturing a multiple glazing with variable liquid-crystal-induced scattering as claimed in claim 17, wherein the mold presses against the glazing at least via a main outer face of the glazing.

20. The process for manufacturing a multiple glazing with variable liquid-crystal-induced scattering as claimed in claim 17, further comprising immobilizing a first electrical cable electrically connected to the first cabling input by inserting a polymer support material about the first electrical cable and in the mold, and heat fluidizing the polymer support material so that the polymer support material solidifies the first electrical cable within the mold.

21. The process for manufacturing a multiple glazing with variable liquid-crystal-induced scattering as claimed in claim 17, wherein forming the water-impermeable seal includes inserting into the mold a material forming the seal, and heat fluidizing the material forming the seal so that the material forming the seal adheres to the glass.

22. The process for manufacturing a multiple glazing with variable liquid-crystal-induced scattering as claimed in claim 21, wherein the mold comprising the material forming the seal is open or pierced with one or more holes on its wall opposite an edge face of the glazing so as to let the first cable exit and/or the mold is open on at least one side so as to let the cabling exit.

23. The process for manufacturing a multiple glazing with variable liquid-crystal-induced scattering as claimed in claim 15, wherein the first electrically insulating polymer, a material immobilizing a first electrical cable electrically connected to the first cabling input, and a material forming a seal outside of the sealing gasket are simultaneous heated.

* * * * *